(12) United States Patent
Kummert et al.

(10) Patent No.: US 8,818,120 B2
(45) Date of Patent: Aug. 26, 2014

(54) METHOD AND DEVICE FOR PRODUCING IMAGE INFORMATION

(75) Inventors: Anton Kummert, Sprockhovel (DE); Sam Schauland, Solingen (DE); Anselm Haselhoff, Wuppertal (DE); Jorg Velten, Wuppertal (DE); Georgios Keremis, Cologne (DE); Marco Krips, Remscheid (DE)

(73) Assignee: Toshiba Electronics Europe GmbH, Düsseldorf (DE)

( * ) Notice: Subject to any disclaimer, the term of this patent is extended or adjusted under 35 U.S.C. 154(b) by 652 days.

(21) Appl. No.: 13/057,933

(22) PCT Filed: Aug. 7, 2009

(86) PCT No.: PCT/EP2009/060296
§ 371 (c)(1),
(2), (4) Date: Jun. 7, 2011

(87) PCT Pub. No.: WO2010/015712
PCT Pub. Date: Feb. 11, 2010

(65) Prior Publication Data
US 2011/0243391 A1      Oct. 6, 2011

(30) Foreign Application Priority Data

Aug. 8, 2008   (DE) .................. 10 2008 036 950
Sep. 12, 2008  (DE) .................. 10 2008 044 521

(51) Int. Cl.
*G06K 9/00* (2006.01)
*G06K 9/36* (2006.01)
*G06K 9/46* (2006.01)

(52) U.S. Cl.
USPC ..................... 382/236; 382/103; 382/107

(58) Field of Classification Search
None
See application file for complete search history.

(56) References Cited

U.S. PATENT DOCUMENTS 5,442,737 A    8/1995  Smith
5,533,181 A    7/1996  Bergsneider
(Continued)

FOREIGN PATENT DOCUMENTS

CN    101083069 A    12/2007
EP    1 906 359 A1    4/2008

OTHER PUBLICATIONS

Office action dated Dec. 4, 2012 in corresponding Chinese Patent Application No. 2009801351731, Filed Aug. 7, 2009.
Henning, Prof. Dr. Peter A.; "Tachenbuch Multimedia", 2. Auflage, FBV Leipzig, 2001, TS & S. 175-191, ISBN 3-446 2175-7: HB.

(Continued)

*Primary Examiner* — Amir Alavi
*Assistant Examiner* — Kenny Cese
(74) *Attorney, Agent, or Firm* — Rankin, Hill & Clark LLP (57) ABSTRACT

The invention relates to a method for generating image information of an image of an image sequence using the image information of a first image. The object of providing a method for generating image information of an image of an image sequence so that a stroboscopic effect is avoided even in the case of varyingly fast movements of the image information and so that a clear display is still possible in the case of low speeds of the image information, is achieved in that the number of intermediate images is determined as a function of the value of the first movement measure and a weighting factor is calculated for each intermediate image.

15 Claims, 6 Drawing Sheets

(56) References Cited

U.S. PATENT DOCUMENTS

| | | | |
|---|---|---|---|
| 2004/0086193 A1* | 5/2004 | Kameyama et al. | 382/254 |
| 2005/0195216 A1* | 9/2005 | Kramer et al. | 345/619 |
| 2007/0078598 A1* | 4/2007 | Watanabe et al. | 701/211 |
| 2007/0153006 A1 | 7/2007 | Robbins et al. | |
| 2008/0018786 A1* | 1/2008 | Kageyama et al. | 348/441 |

OTHER PUBLICATIONS

Korein, J. et al.; "Temporal Anti-Aliasing in Computer Generated Animation"; Computer Graphics, vol. 17, 1983, p. 377-388.

Sung, K. et al.; "Spatial-Temporal Antialiasing"; IEEE Transactions on Visualization and Computer Graphics, vol. 8, Apr.-Jun. 2002, p. 144-153.

* cited by examiner

METHOD AND DEVICE FOR PRODUCING IMAGE INFORMATION

The invention relates to a method for generating image information of an image of an image sequence using the image information of a first image, in which method
- the image information in the first image have a starting position and the image information in the image to be generated have an end position,
- a first movement measure for the movement of the image information from the starting position to the end position is determined or preset,
- intermediate images for intermediate positions of the image information are calculated,
- the image information of the intermediate images are multiplied by weighting factors and are superimposed with the image information of the first image into image information of the image to be generated, and
- the image generated that way is displayed or further processed.

The invention also relates to a computer program product and to a device for implementing the method according to the invention, as well as to advantageous uses.

Methods for generating image information of an image of an image sequence are employed in many fields where image information which has been previously calculated are displayed on displays, for example. However, moving image information in particular which move from a starting position into an end position within a specific period of time can become problematic in respect of the visibility of the image information. For instance, in a display, constant repetition rates are usually used to produce moving images. In the conventional display of moving images, rapid movements entail stroboscopic-type artefacts of the display, for which the human eye detects the moving image information in different places in a simultaneous and stationary manner. This occurs, for example in the display of rotating pointers in a display, but also in the display of other movements, in particular linear movements. If a movement of image information takes place in two successive images, a first movement measure can be determined for the movement of the image information in the image. In the context of the present invention, the first movement measure is determined from the difference between the starting position and the end position of the image information or else is definitively preset. The movement measure corresponds to the change in movement of the image information between two different images which are displayed at different times, and in this respect represents a type of speed. The term "image information" is understood as meaning information presented in the image, for example objects or, respectively, the associated colour values and position of the corresponding pixels of the image. The term "intermediate images" denotes images which divide into intermediate positions the movement of the image information from the starting position into the end position. A calculation and superimposition of intermediate images which are previously multiplied by a weighting factor is used, for example in "motion blurring" to improve the graphic display on a display for the human eye. However, in the case of dynamic movements, i.e. movements of image information for which the movement measure is constantly changing, problems still arise in the display. If too many intermediate images are generated and superimposed with the original image, the display of the image information is blurred. If the number of intermediate images which are superimposed is set too low, the undesired stroboscopic effect occurs in the case of rapid movements. A clear display and a very good visibility and readability of moving image information are expected, for example, in the case of displays in motor vehicles, in aircrafts, which displays are necessary for operating the vehicles. Thus to avoid generating safety problems, the electronic display of pointer instruments has hitherto frequently been dispensed with in such applications.

On this basis, the object of the present invention is to provide a method for generating image information of an image of an image sequence so that even if the image information move at varyingly fast speeds, a stroboscopic effect is avoided and a clear display is still achieved with low speeds of the image information. The invention is also based on the object of proposing a computer program product and a device for implementing the method according to the invention and of indicating an advantageous use of the method according to the invention.

According to a first teaching of the present invention, the object indicated above is achieved in that the number of intermediate images is determined as a function of the value of the first movement measure and a weighting factor is calculated for each intermediate image.

It has been found that the variable choice of the number of intermediate images as a function of the value of the first movement measure, i.e. of the change in movement between two images makes it possible to use, for example, fewer intermediate images in the case of slow movements and to use a greater number of intermediate images in the case of fast movements. As a result, for low speeds the displayed image information continues to be displayed in a sharp manner and for high speeds, the stroboscopic effect does not arise.

According to a first embodiment of the method according to the invention, the number of intermediate images is proportional to the value of the first movement measure, the number of intermediate images optionally being determined by dividing the first movement measure by a resolution value. The resolution value can be predetermined in order to adjust the quality of the display. A reduction of the resolution value leads to a higher number of intermediate images and to an improved display, but also to an increased computational cost. Due to the proportionality of the number of intermediate mages to the value of the first movement measure, it can easily be ensured that for the sharp display of slow-moving image information, a small number of intermediate images is generated and in the case of fast-moving image information, a large number of intermediate images is generated. In the case of rotating pointers, it has proved to be advantageous, for example, to limit the resolution factor, which is predetermined as an angle in degrees, as follows:

$$\gamma \le \frac{180°}{2\pi r_z},$$

where $r_z$ is the radial length of the pointer expressed in the number of pixels.

According to an advantageous embodiment, a further improvement in the display of image information is achieved in that the weighting factors have a value which is a function of the number of intermediate images $n_{max}$. For example, the weighting factor $h_n$ can be determined according to the following variant:

$$h_n = \frac{1}{(n_{max}+1)}, \text{ where } n = 0, \ldots, n_{max},$$

wherein the following applies for $n_{max}$:

$$n_{max} = \text{round}\left(\frac{\omega}{\gamma}\right)$$

where $\omega$ corresponds to the first movement measure and $\gamma$ corresponds to the resolution value.

A further improved embodiment of the method according to the invention calculates the number of images $n_{max}$ and the weighting factors $h_n$ in another way. According to this embodiment:

$$n_{max} = 2 \cdot \text{round}\left(\frac{\omega}{\gamma}\right)$$

where $$h_n = \frac{1 - \cos\left(2\pi \frac{n+1}{2+n_{max}}\right)}{1 + n_{max} - \sum_{i=0}^{n_{max}} \cos\left(2\pi \frac{i+1}{2+n_{max}}\right)}, \text{ where } n = 0, \ldots, n_{max}.$$

Although the last embodiment in particular involves an increased computational cost, however it allows a further increase in the image quality to be achieved in the case of rotating pointers. Other types of calculation for $n_{max}$ and $h_n$ are also conceivable.

If according to a next configuration of the method according to the invention intermediate positions of the image information between starting and end positions are used to calculate the intermediate images and the image information of the superimposed image is corrected by half the first movement measure against the direction of movement, it is possible to further improve the display of the moving image information. In particular, the positions of the image information of the intermediate images are then arranged symmetrically around the positions of the image information in the image to be generated, as will be shown later on in FIG. 7.

It has been found that it is advantageous, according to a further embodiment of the method according to the invention, to calculate the intermediate positions of the image information of the intermediate images by displacing the image information of the first image by integer multiples of the resolution value. This presents a simple possibility of using the resolution value γ to determine the positions of the image information of the intermediate images and in this respect to adjust the accuracy of the display of the generated, superimposed image.

A further advantageous embodiment of the method according to the invention is characterised in that at least one original image is used to calculate the intermediate images, a second movement measure between the starting position of the image information in the original image and the end position of the image information in the image to be generated is determined or transmitted, the image information of the intermediate images are superimposed with the image information of the original image using weighting factors and the image information of the superimposed image is displaced by the second movement measure to the end position of the image information. This makes it possible to use a second movement measure, with which original images which are already known can be moved into the end position of the image to be generated. In this respect, the superimposition of the intermediate images takes place by the superimposition of displaced original images. For example, as a result it is possible to provide for each first movement measure a pattern or, respectively, a template by superimposing the generated intermediate images of the original image, which template only has to be displaced by the second movement measure in order to obtain the image, to be generated, of the image sequence. The term "displacement" can be understood, for example as a translatory movement, for example a linear movement as well as a rotatory movement, for example a non-linear movement. This embodiment of the method according to the invention is particularly suitable when the image information to be displayed can be traced back to original images. When a plurality of original images is used, additional effects can be considered during the generation of the image information through the choice of the original images, for example as a function of the second movement measure. For example, as a result, it is possible to display shadow effects in the image sequence as a function of the second movement measure.

According to a further embodiment of the method according to the invention, the display of the generated image of the image sequence can be improved in that the end positions of the image information in the superimposed image are corrected by half the first movement measure in negative direction of movement. If the first movement measure is an angular difference of a rotation about an axis of rotation in a predetermined unit of time, a rotation takes place counter to the direction of the movement measure so that the stroboscopic artefact-free display of, for example, rotating pointers is improved.

If at least one original image is used, rotating pointers can be displayed in an improved manner in that the second movement measure is an angle, for example the angle between the pointer position in the original image and the pointer position in the image, to be generated, of the image sequence.

In order to reduce the computational cost for displaying the image sequence, the method according to the invention can be improved in that the image information of the intermediate images are calculated offline for at least one predefined, first movement measure and the image information generated by superimposing the calculated image information of the intermediate images are stored in a storage as a template for each first movement measure. For example, for values of the movement measure from 0 to $\omega_{max}$, it is possible to determine sampling points $\omega_i$ for which a pattern or, respectively, a template is generated. The intervals of the individual movement measure sampling points $\omega_i$ can be selected linearly or non-linearly, for example logarithmically. The unit of time for the movement measure $\omega_i$ can be, for example the unit of time of the image frame rate during the display of the images, but can also be a sampling rate, for example of a sensor. In offline mode, the generated templates are stored in advance and, for example, can be displaced according to the second movement measure for every movement measure to be displayed and can be displayed.

The image information of the first image, of the intermediate images and of the original images preferably at least consist of colour values and transparency values per pixel of the image. For example, the pixels can be stored electronically in an RGBα format or also in an αRGB format. Another format is CMY (K). By means of the transparency values, for example α or K, superimpositions of the images with other images, for example a background image which does not have to be calculated anew, can easily be performed. The finished image to be generated only has RGB or CMY values, when it is to be displayed. However, there are also other possibilities of describing image information of images and of superimposing them.

According to a second teaching of the present invention, the object indicated above is achieved by a computer program product for implementing the method according to the invention. The computer program product can induce processor means to implement the method according to the invention.

The method according to the invention can be realised not only by a computer program based on software however, but also according to a third teaching of the present invention by a device for implementing the method according to the invention which comprises storage means, calculation means as well as input and output means, where the input means allow at least the input of a first movement measure of image information of a first image of an image sequence, the calculation means allow at least a superimposition of calculated intermediate images and the output means allows at least the display of the generated image. According devices can, on the one hand, implement the method according to the invention by a computer program, i.e. by software on standard components. On the other hand, to minimise costs, a device can also be provided which has special hardware-implemented components which specifically provide storage means, calculation means, input and output means for implementing the method according to the invention.

According to a fourth teaching of the present invention, the object indicated above is achieved by using the method according to the invention for displaying image information of an image of an image sequence on a display, in particular for displaying rotations of pointers. The use of the method according to the invention makes it possible to display on a display movements which are free from stroboscopic artefacts and thus to achieve a very realistic display of objects and image information, respectively.

For this reason, it is also particularly advantageous to use the method according to the invention to display pointer instruments, particularly of a motor vehicle, air craft, helicopter. On the one hand, the use of the method according to the invention for displaying corresponding pointer instruments reduces the computational costs for a photo-realistic display without stroboscopic-type artefacts of corresponding pointer instruments on a display and furthermore can allow a reduction in costs and an increase in the flexibility of the display of corresponding pointer instruments. In addition, further uses of the method according to the invention are conceivable if moving objects or images have to be displayed on a display.

There are many possibilities for developing and configuring the method according to the invention, the computer program product according to the invention and the device according to the invention as well as the use of the method according to the invention. In this respect, reference is made on the one hand to the claims following claims 1 and 14 and on the other hand to the description of an exemplary embodiment taken in conjunction with the drawings, in which:

Figure 1:
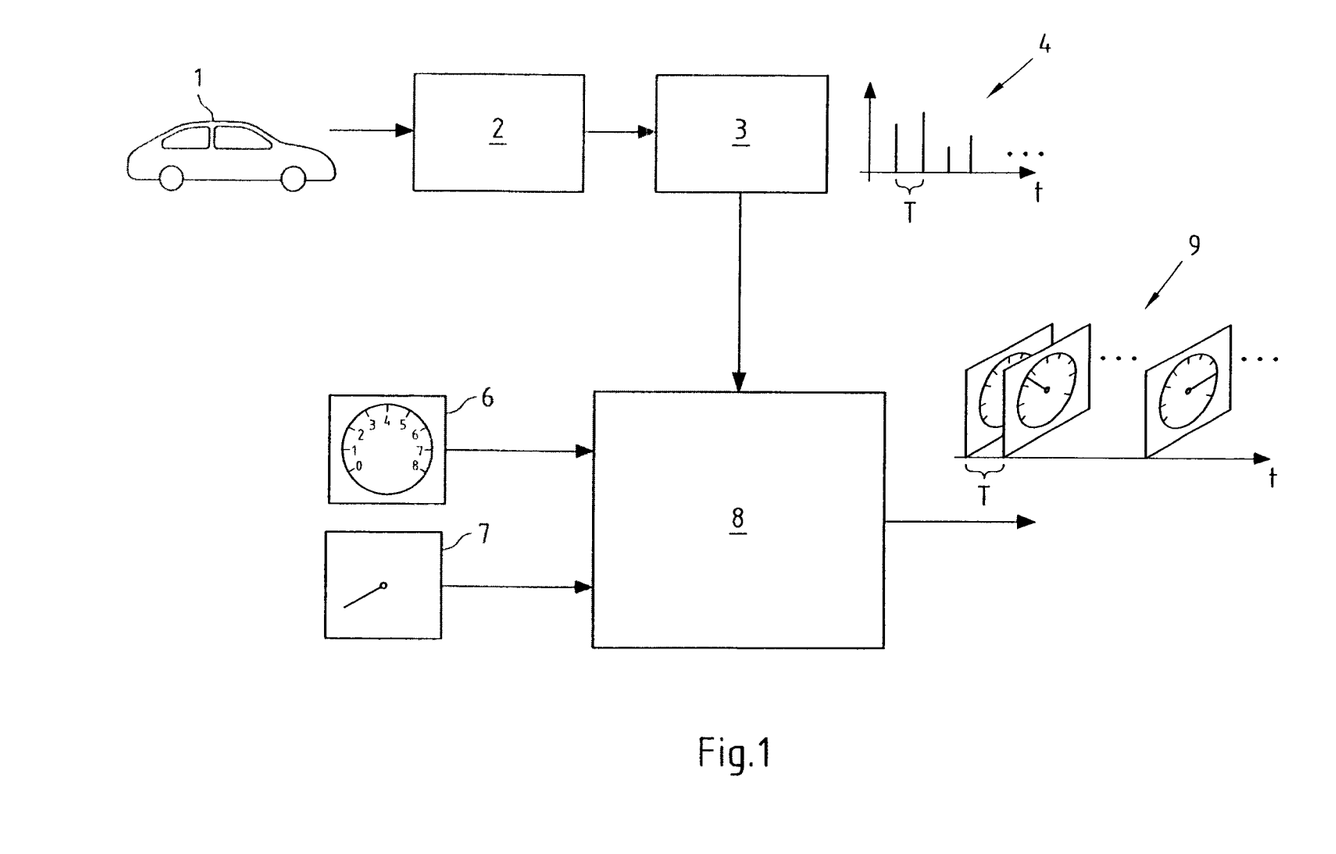
FIG. 1 shows in a diagram an exemplary embodiment of a use according to the invention of the method according to the invention for generating image information of an image of an image sequence.

FIG. 1 shows in a diagram an exemplary embodiment of a use according to the invention of the method according to the invention. The method according to the invention is used in a motor vehicle 1 to display the revolution counter in a cockpit. The measured value of the sensor for determining the revolution speed of the engine is scanned via a scanning means 2 at a specific rate 1/T. The revolution speed values are associated with an angular value, which the position of the pointer in the revolution counter configured as a pointer instrument, or are converted into an angular angle, respectively. This takes place in block 3. The diagram 4 shows the angular values which have been determined in block 3 and which vary over time t due to changes in the revolution speed of the engine.

The illustrated embodiment of the method according to the invention uses a background image 6 of the revolution counter and an original image 7 of the pointer of the revolution counter, which are provided, for example in an RGBα format. The embodiment of the method 8 according to the invention then generates an image sequence 9, for example also in the RGB format.

Figure 2:
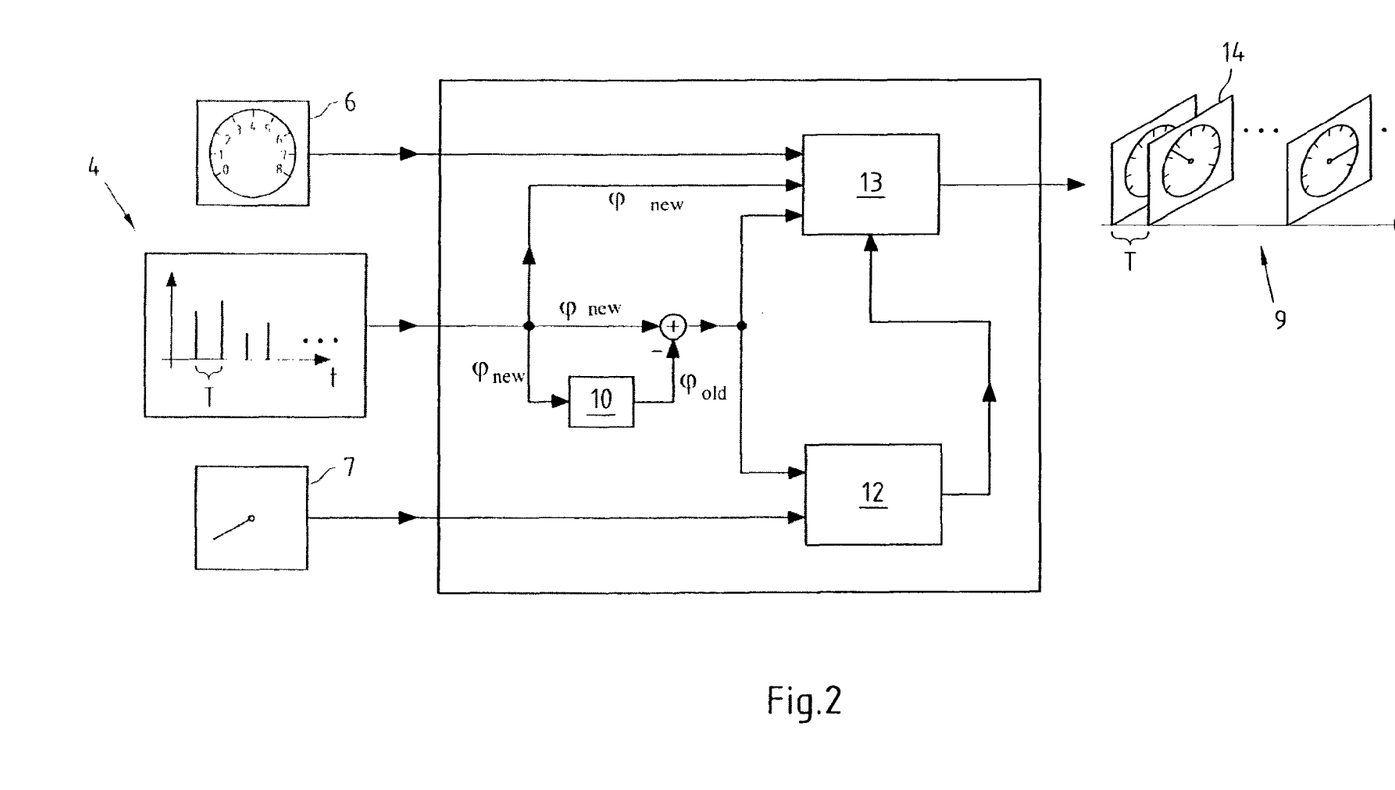
FIG. 2 shows in a diagram the generation of the first and of the second movement measure for the exemplary embodiment of FIG. 1.

FIG. 2 shows the determination of the first and of the second movement measure according to the exemplary embodiment of the method according to the invention for displaying pointers of a revolution counter. The first movement measure ω and the second movement measure $\phi_{new}$ are determined from the measured values of the revolution counter sensor, as already shown in FIG. 1. The measured values of the revolution counter sensor are firstly converted into angular values φ to display the pointer. The previously determined measured value $\phi_{old}$ is stored in an intermediate storage 10 for one scanning period T in each case and, after a new angular measured value has been determined for the revolution counter $\phi_{new}$, is subtracted therefrom. As a result, the first movement measure ω, which can have both a positive and a negative sign, is obtained. ω then corresponds to the angular change within one scanning period and in this respect corresponds to an angular speed. The first movement measure ω is then transferred to block 12 which undertakes the intermediate image calculations and the generation of the templates.

In the present exemplary embodiment of the method according to the invention, an original image 7, i.e. for example an image of a pointer in a predetermined position, for example the zero revolution speed position, is also transferred to block 12. For its part, block 12 then forwards to block 13 the patterns or, respectively, templates of the pointer image determined as a function of the first movement measure. In block 13, using the background image 6 of the revolution counter, the angle of the revolution counter $\phi_{new}$ to be displayed and the determined first movement measure ω, an image of the revolution counter including pointer 14 is generated which can then be displayed in an image sequence, for example.

Figure 3:
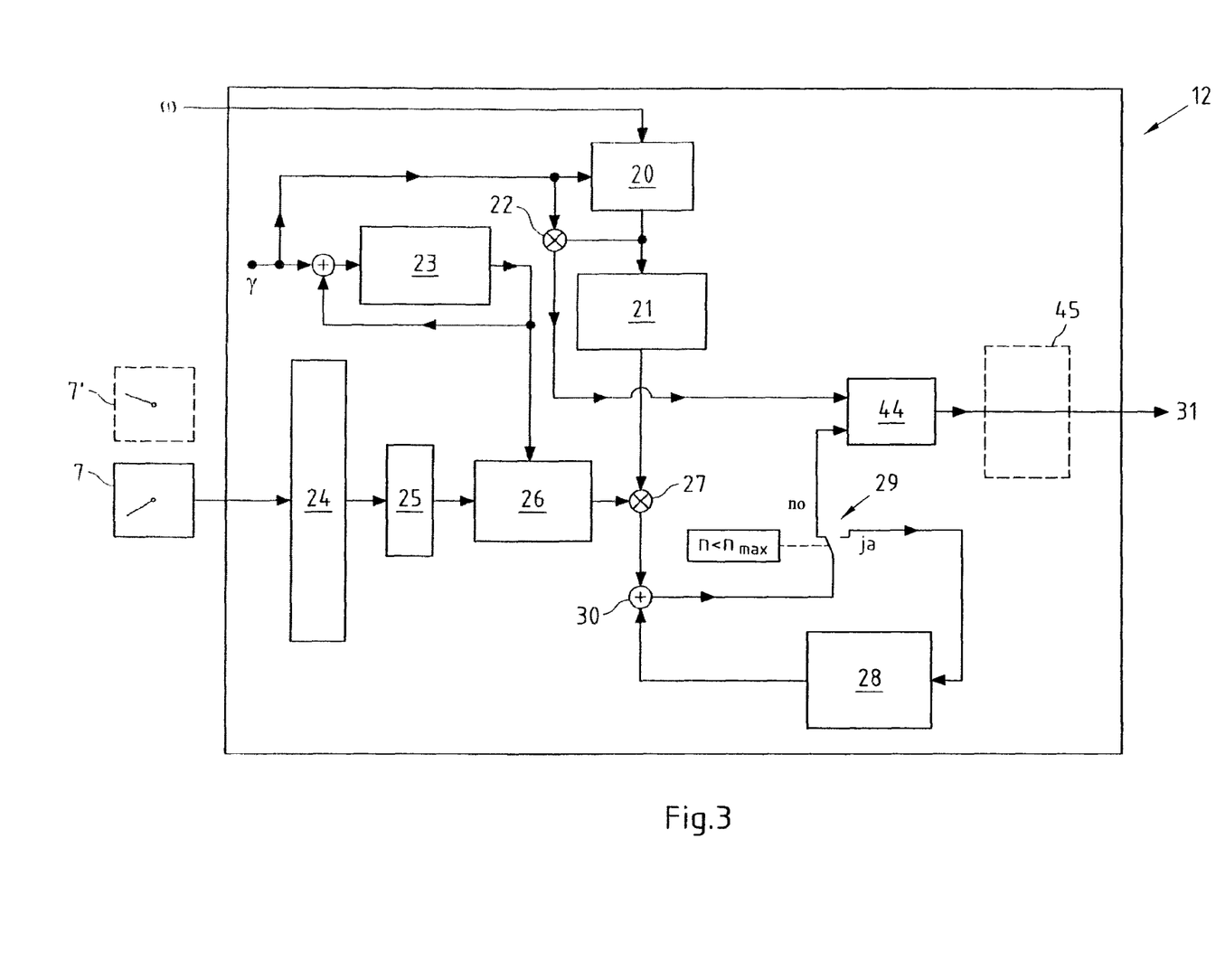
FIG. 3 shows in a block diagram an exemplary embodiment of the method according to the invention used to display rotating pointers.

FIG. 3 now shows the construction of block 12 in the case of the use of the method according to the invention according to the present exemplary embodiment to display the revolution counter of a motor vehicle. First of all, block 12 is cyclically supplied in a frequency 1/T with the determined difference between old angular position $\phi_{old}$ and new angular position $\phi_{new}$ of the revolution counter as first movement measure ω. The cycle time T thereby corresponds to the scanning rate or, respectively, clock time of the provision of the sensor value of the revolution counter sensor. All further steps which will now be described preferably take place within one clock rate for the calculation of the images to be displayed being carried out online, i.e. within period T.

First of all, the maximum number of intermediate images $n_{max}$ is calculated by a predetermined resolution value γ in block 20. The type of calculation of the maximum number of intermediate images $n_{max}$ can depend on the choice of the weighting factor. In the simplest case:

$$n_{max} = \text{round}\left(\frac{\omega}{\gamma}\right)$$

Starting from block 20, first of all the maximum angle of rotation $\beta_{stop}$ is determined, where, in the simplest case:

$$\beta_{stop} = n_{max} \cdot \gamma.$$

In block 21, the weighting factors $h_n$, for $n=0, \ldots, n_{max}$, are then determined as a function of $n_{max}$. Here as well, as a function of the calculation of $n_{max}$ there are two different possibilities, already indicated in the description, for calculating the weighting factors. In the embodiment shown in FIG. 3, an original image 7 is used to generate the image of the image sequence. In block 24, firstly the original image 7, for example in the RGBα format, is changed in that every RGB value of each pixel of the original image is multiplied by the respective α-value, i.e. by the respective transparency value, and then is stored in the image storage 25. This measure allows even slightly transparent pointers, the pixels of which have α-values of less than 1, to be processed and displayed in an optimised manner in respect of stroboscopic artefacts. Of course, this applies not only to the display of semi-transparent, for example glassy pointers, but also to the display of arbitrary movements of "semi-transparent" or partially transparent objects. At the same time, the computational cost is reduced in that the thus generated image contains zero values as RGB values in specific places, namely for example where the pointer image 7 is completely transparent.

To generate the intermediate images, the angular value which is in the storage cell 23 is transferred to block 26 which then rotates the original image stored in the image storage 25 by the transferred angular value β. β is defined as:

$$\beta = n \cdot \gamma \text{ where } n = 0, \ldots, n_{max}.$$

At the start, the storage 23 is initialised and in this respect contains the value 0, so that block 26 outputs the original image which is then multiplied by the weighting factor $h_0$ in position 27. The intermediate image obtained in this way, for $n=0$ this corresponds to the original image multiplied by the weighting factor $h_0$, is passed on to an image storage 28, as long as $n<n_{max}$. The query whether $n_{max}$ has been reached takes place in position 29. After the generation of the first intermediate image with $n=0$, the value γ is transferred to the storage 23, so that the following applies for the second intermediate image:

$$\beta = \gamma.$$

The last intermediate image is then rotated by the angle $$\beta_{stop} = n_{max} \cdot \gamma.$$

As can be discerned from this, the maximum angle of rotation of the intermediate image generation $\beta_{stop}$ is divided into steps with step width γ and an intermediate image is generated for each step. Namely, in the next step, for example, in block 26 the rotation of the original image by the angle γ is and for the next intermediate image is rotated by the angle 2γ. The thus generated intermediate images are multiplied at point 27 by the associated weighting factors $h_n$ and added together at point 30 and transferred to the image storage 28. By the addition of the intermediate images multiplied by the weighting factors, intermediate images are superimposed, the number of intermediate images being a function of the first movement measure ω and the resolution value or the step width γ, respectively.

In the case of a high value for ω, i.e. for high angular speeds, for example more intermediate images are generated, whereas in the case of low angular speeds, fewer intermediate images are generated. This provides an optimum display of the pointers in spite of different speeds in the change of position of the image information. Thus, the method according to the invention also allows the display of revolution counters at arbitrary rotating speeds without stroboscopic-type artefacts and blurriness in the case of very slow movements.

When the last intermediate image has been generated for $n_{max}$ and has been superimposed with the intermediate images which are already superimposed in the image storage 28, the resulting superimposed image of the pointer position, hereafter referred to as a pattern or template, is rotated back by the angle $-\beta_{stop}/2$ in block 44 so that the intermediate images have been generated symmetrically, for example around the position of the pointer in the original image 7. The thus generated template or the thus generated pattern, respectively, in the RGBα format is then transferred to block 13. Thus, a template is generated for every first movement measure ω.

Before being transferred to block 13, the RGB values of the generated template can optionally be divided by the associated α-value. This takes place in the optional block 45. This makes it possible to use, for example a conventional α-blending engine which is available, for example hardware-implemented, for superimposing the template with the background. When the image frame 37 is generated in FIG. 4, the use of an α-blending engine requires the optional multiplication 38 of the RGB values of the image by the α-matrix of the generated image.

In order to restrict the number of possible templates, sampling points $\omega_0$ to $\omega_{max}$ can be determined for the angular changes which are to be expected within one clock rate and templates can be generated in each case for the associated $\omega_i$. As previously explained, the intervals of the sampling points of the first movement measure $\omega_i$ can be linear as also, for example, logarithmic.

It is also indicated in FIG. 3 that a further original image 7' can be used to generate the superimposed intermediate images. The original image 7' can for example be selected if, at a specific angular position $\phi_{new}$, for example a shadowing has to be considered which is not contained in the original image 7. Therefore, the use of different original images makes it possible to consider additional graphic effects.

Figure 4:
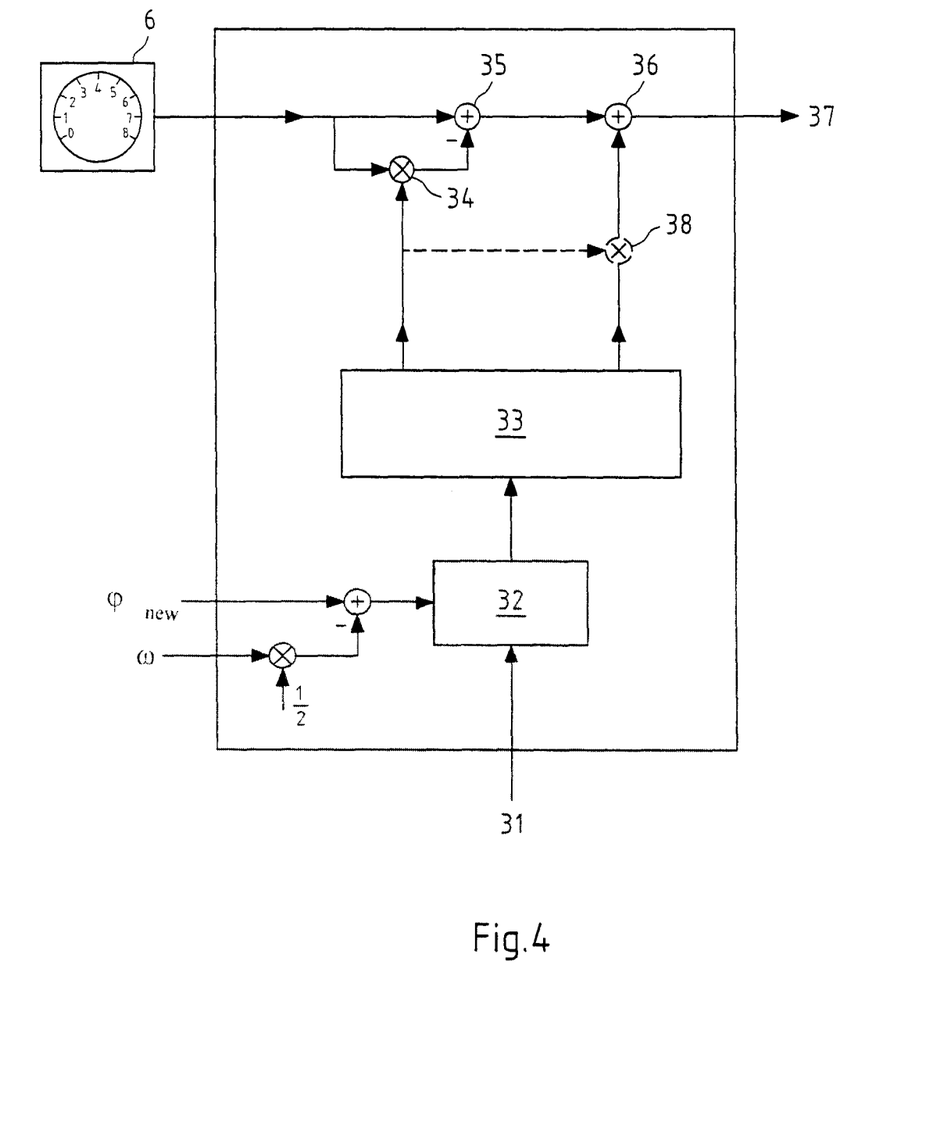
FIG. 4 shows in a block diagram a second exemplary embodiment of the method according to the invention.

FIG. 4 now shows how the image of the revolution counter with a pointer position indicating the revolution speed of the engine is generated in block 13 from the patterns or, respectively, templates in RGBα format transferred from block 12. First of all, the template 31 is transferred together with the angle ϕ to block 32. ϕ is preferably determined by the following equation:

$$\hat{\varphi} = \varphi_{new} - \frac{1}{2} \cdot \omega.$$

In block 32, the transferred template 31 is then rotated by angle ϕ. It has been found that a correction of the angle ϕ by half the movement measure ω results in an improved display of the revolution counter. In principle, a rotation can also take place by angle $\phi_{new}$ without a correction. In block 33, the α-values of each pixel are extracted from the rotated image of the pointer and are multiplied by the RGB values of the pixels of the background image 6 in order to then in turn be subtracted 35 from said values. The result which is in the RGB format is then combined additively 36 with the RGB portion of the rotated image of the pointer. The image frame 37 present in the RGB format is then forwarded, for example, to output means to be displayed on a display. However, it is equally possible to forward the images to be displayed to output means in the RGBα format or in another format.

Figure 5:
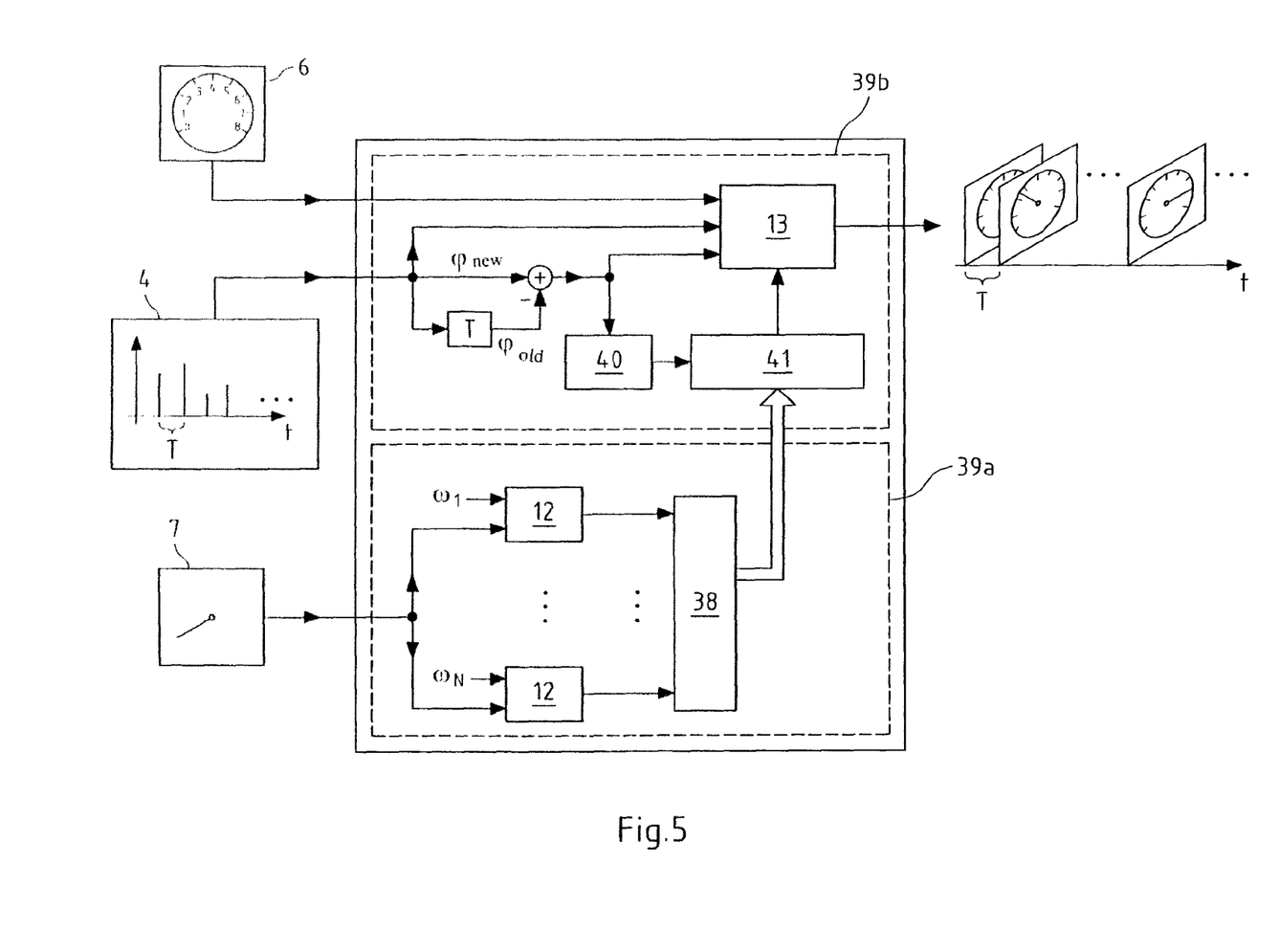
FIG. 5 shows in a block diagram a further exemplary embodiment of the method according to the invention, in which the intermediate image calculations are carried out offline.

FIG. 5 shows a further exemplary embodiment of the method according to the invention, in which the templates for the different movement measures ω to $\omega_{max}$ are determined sequentially or simultaneously in advance, i.e. offline in module 39a and are stored in a storage medium. For this, FIG. 5 shows for a parallel processing N blocks 12 which determine templates for all possible first movement measures $\omega_i$ offline, i.e. independently of the current pointer position. These templates are stored in storage 38 and transferred to the online module 39b. The split-up into an offline calculation of the templates to be used and into a display of the pointer position, to be carried out online significantly reduces the calculation costs and thus also the costs for the preparation of devices for implementing the method according to the invention.

The first and second movement measures $\phi_{new}$ and ω are determined in the online module 39 from the forwarded angular values of the revolution counter 4. Instead of the calculation of the corresponding template for the respective ω, now only the storage address is calculated in block 40 in which the respective template for the specific ω is stored in storage medium 41. The respective template, for example in RGBα format is then transferred to block 13 from storage medium 41 and is superimposed with the background image, so that as a result an image sequence of the revolution counter 14 is generated.

Figure 6:
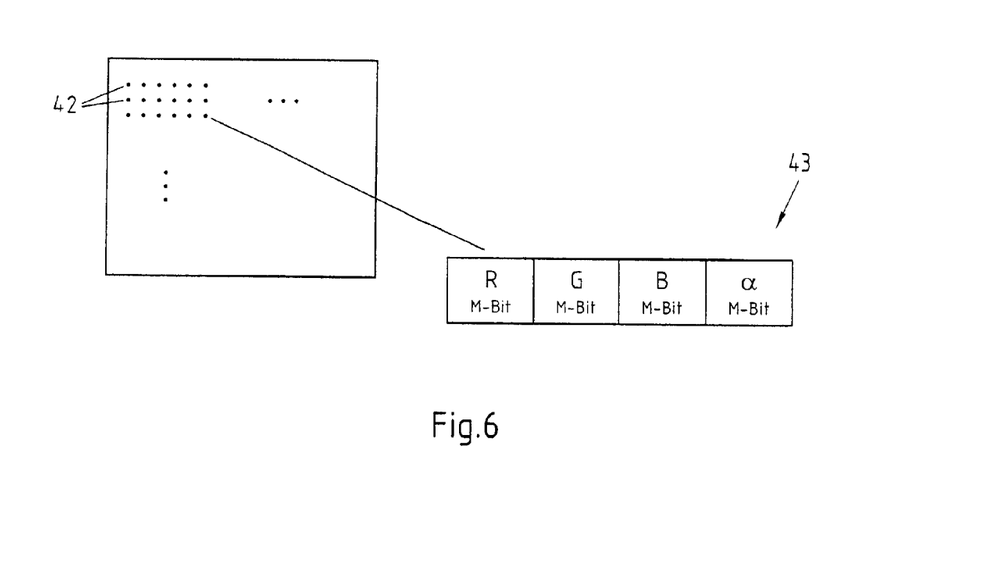
FIG. 6 shows a diagram of the configuration of image information in the present case in RGBα format.

FIG. 6 shows the construction of an image in the RGBα format as well as a conventional construction of a storage region associated with a pixel. Equal numbers of bits are typically provided for all the RGBα values. For example, 8 bits are provided in each case for the RGBα values. However, it is conceivable that a different number of bits could also be used. The higher the number of bits used, the greater the computational cost and the more realistic the representation of the colour values in the image.

Figure 7A:
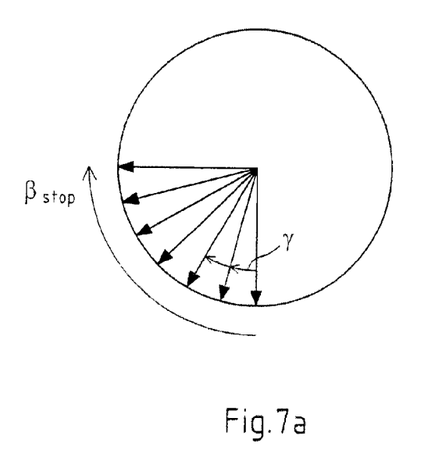
FIG. 7 shows a diagram of the generation of a template of intermediate images with an original image.
Figure 7B:
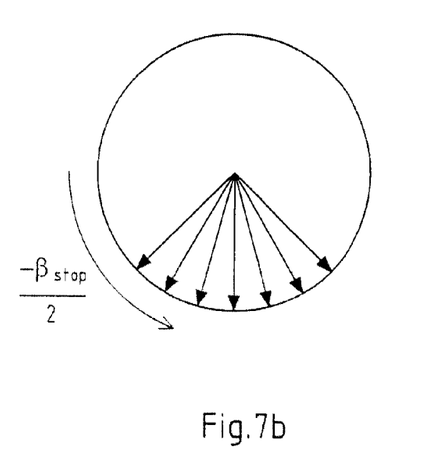

Finally, FIG. 7 schematically shows the generation of intermediate images of a rotating pointer for an angular speed ω with a value of 6 for $n_{max}$. Firstly, FIG. 7a) shows that the intermediate images (each pointer represents an intermediate image) have in each case an angular spacing of γ. Such a number of intermediate images are generated until the original image with the pointer directed vertically downwards is rotated by the angle $\beta_{stop}$ and is superimposed with the other generated intermediate images. $\beta_{stop}$ corresponds to $n_{max}\cdot\gamma$, with γ as the resolution value. Thereafter, the superimposed image is rotated back by $-\beta_{stop}/2$, as shown in FIG. 7b). The intermediate images in the resulting image in FIG. 7b) are then positioned symmetrically around the original image, so that by a rotatation of the template by $\phi_{new}$ or by φ, respectively, the template can be superimposed with the background image 6 and can be used to display the revolution counter in the desired angular position.

The invention claimed is:

1. A method for generating image information of an image of an image sequence using the image information of a first image, in which method the image information in the first image have a starting position and the image information in the image to be generated have an end position, a first movement measure for the movement of the image information from the starting position to the end position is determined or preset, intermediate images for intermediate positions of the image information are calculated, the image information of the intermediate images are multiplied by weighting factors and are superimposed with the image information of the first image into image information of the image to be generated, and the image generated that way is displayed or further processed, wherein the number of intermediate images is determined as a function of the value of the first movement measure and a weighting factor is calculated for each intermediate image, and wherein the number of intermediate images is proportional to the value of the first movement measure, the number of intermediate images optionally being determined by dividing the first movement measure by a resolution value.

2. The method according to claim 1, wherein the weighting factors have a value which is a function of the number of intermediate images.

3. The method according to claim 1, wherein intermediate positions of the image information between starting and end positions are used to calculate the intermediate images and the image information of the superimposed image is corrected by half the first movement measure against the direction of movement.

4. The method according to claim 1, wherein the intermediate positions of the image information of the intermediate images are calculated by displacing the image information of the first image by integer multiples of the resolution value.

5. The method according to claim 1, wherein at least one original image is used to calculate the intermediate images, a second movement measure between the starting position of the image information in the original image and the end position of the image information in the image to be generated is determined or transferred, the image information of the intermediate images are superimposed with the image information of the original image using weighting factors and the image information of the superimposed image is displaced by the second movement measure to the end position of the image information.

6. The method according to claim 1, wherein the end positions of the image information in the superimposed image are corrected by half the first movement measure in a negative direction of movement.

7. The method according to claim 1, wherein the first movement measure is an angular difference of a rotation about an axis of rotation in a predetermined unit of time.

8. The method according to claim 7, wherein the second movement measure is an angle.

9. The method according to claim 1, wherein the image information of the intermediate images are calculated offline for at least one predefined first movement measure and the image information generated by superimposing the calculated image information of the intermediate images are stored for each first movement measure in a storage as a template.

10. The method according to claim 1, wherein the image information of the first image, of the intermediate images and original images consist of colour values and transparency values per pixel of the image.

11. A non-transitory computer-readable medium comprising instructions for inducing a processor means to implement a method for generating image information of an image of an image sequence using the image information of a first image, in which method the image information in the first image have a starting position and the image information in the image to be generated have an end position, a first movement measure for the movement of the image information from the starting position to the end position is determined or preset, intermediate images for intermediate positions of the image information are calculated, the image information of the intermediate images are multiplied by weighting factors and are superimposed with the image information of the first image into image information of the image to be generated, and the image generated that way is displayed or further processed, wherein the number of intermediate images is determined as a function of the value of the first movement measure and a weighting factor is calculated for each intermediate image, and wherein the number of intermediate images is proportional to the value of the first movement measure, the number of intermediate images optionally being determined by dividing the first movement measure by a resolution value.

12. A device configured to implement a method for generating image information of an image of an image sequence using the image information of a first image, in which method the image information in the first image have a starting position and the image information in the image to be generated have an end position, a first movement measure for the movement of the image information from the starting position to the end position is determined or preset, intermediate images for intermediate positions of the image information are calculated, the image information of the intermediate images are multiplied by weighting factors and are superimposed with the image information of the first image into image information of the image to be generated, and the image generated that way is displayed or further processed, wherein the number of intermediate images is determined as a function of the value of the first movement measure and a weighting factor is calculated for each intermediate image, said device comprising storage means, calculation means as well as input and output means, where the input means allow at least the input of a first movement measure of image information of a first image of an image sequence, the calculation means allow a superimposition of calculated intermediate images and the output means allow the display of the generated image, and wherein the number of intermediate images is proportional to the value of the first movement measure, the number of intermediate images optionally being determined by dividing the first movement measure by a resolution value.

13. The method according to claim 1 wherein the image information of the image of the image sequence is displayed on a display.

14. The method according to claim 13, wherein the display displays rotations of pointers of a pointer instrument.

15. The method according to claim 14 wherein the pointer instrument is displayed in a motor vehicle, an aircraft or a helicopter.

* * * * *